United States Patent [19]

Feigler et al.

[11] Patent Number: 5,295,566
[45] Date of Patent: Mar. 22, 1994

[54] CLUTCH RELEASE BEARING ASSEMBLY, ESPECIALLY FOR A MOTOR VEHICLE

[75] Inventors: Jacques Feigler, St. Brice sur Foret; Bernard Bulot, Ferrieres, both of France

[73] Assignee: VALEO, Paris, France

[21] Appl. No.: 22,273

[22] Filed: Feb. 25, 1993

[30] Foreign Application Priority Data

Feb. 28, 1992 [FR] France .................. 92 02338
Jun. 26, 1992 [FR] France .................. 92 07876

[51] Int. Cl.$^5$ .............................................. F16D 23/14
[52] U.S. Cl. .................. 192/98; 192/89 PL; 192/89 SD; 192/110 B
[58] Field of Search .............. 192/98, 110 B, 110 R, 192/89 PL, 89 SD

[56] References Cited

U.S. PATENT DOCUMENTS

| | | | |
|---|---|---|---|
| 4,276,974 | 7/1981 | Ladin | 192/110 B X |
| 4,399,898 | 8/1983 | Olschewski et al. | 192/110 B X |
| 4,632,237 | 12/1986 | Maycock et al. | 192/89 PL X |
| 4,643,286 | 2/1987 | Lassiaz | 192/110 B X |
| 4,646,897 | 3/1987 | Winters | 192/98 |
| 4,646,901 | 3/1987 | Lassiaz et al. | 192/89 PL X |
| 4,832,166 | 5/1989 | Parzefall | 192/98 |
| 4,852,710 | 8/1989 | Gay et al. | 192/98 |
| 4,872,539 | 10/1989 | Gay et al. | 192/98 |
| 4,907,807 | 2/1990 | Kabayama et al. | 192/98 |
| 4,909,370 | 3/1990 | Limbacher et al. | 192/98 |
| 5,082,098 | 1/1992 | Gay et al. | 192/98 X |
| 5,090,541 | 2/1992 | Marchisio et al. | 192/98 |
| 5,113,989 | 5/1992 | Feigler | 192/98 |
| 5,150,778 | 9/1992 | Wolbers et al. | 192/110 B X |

FOREIGN PATENT DOCUMENTS

| | | |
|---|---|---|
| 0153087 | 8/1985 | European Pat. Off. . |
| 0200338 | 10/1986 | European Pat. Off. . |
| 3328128 | 2/1985 | Fed. Rep. of Germany . |
| 2101726 | 3/1972 | France . |
| 2544035 | 10/1984 | France . |
| 2544036 | 10/1984 | France . |
| 2557235 | 6/1985 | France . |
| 2629882 | 10/1989 | France . |
| 2629885 | 10/1989 | France . |
| 2630174 | 10/1989 | France . |

*Primary Examiner*—Leslie A. Braun
*Assistant Examiner*—Andrea Pitts
*Attorney, Agent, or Firm*—Longacre & White

[57] ABSTRACT

A clutch release bearing assembly comprises a clutch release bearing having an actuating element which defines an actuating nose, a coupling member carried by a connecting piece which is prefitted to the diaphragm or other declutching member of the clutch, and at least one resilient retaining ring for holding the coupling member permanently between a drive surface of the connecting piece and an actuating flank or thrust shoulder of a groove formed around the actuating nose. This groove is elongated away from the thrust shoulder, so that at least one axially acting resilient ring can be fitted into the groove in advance, with the thrust shoulder acting as an abutment for this ring.

22 Claims, 10 Drawing Sheets

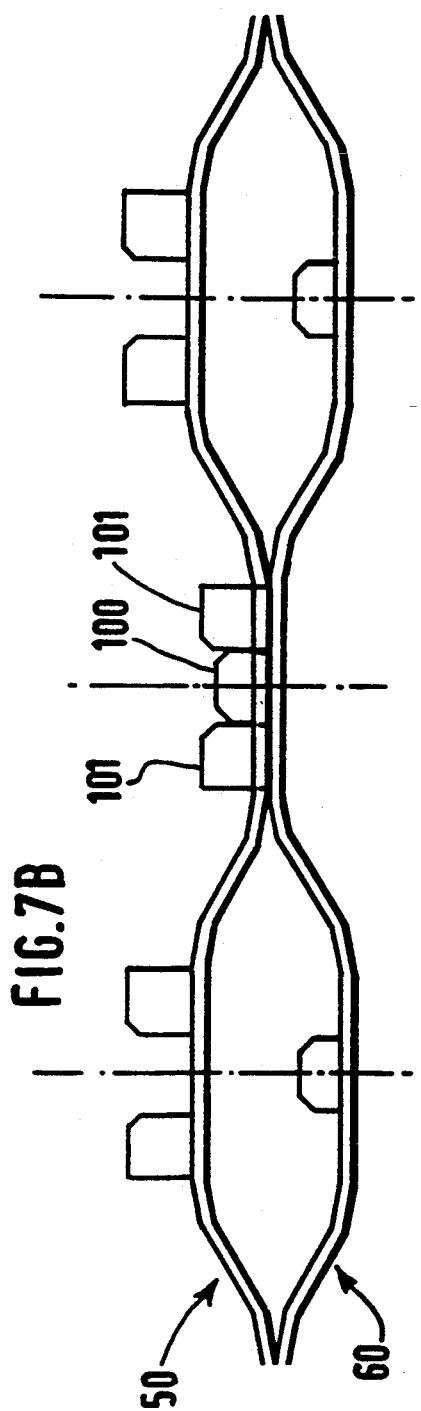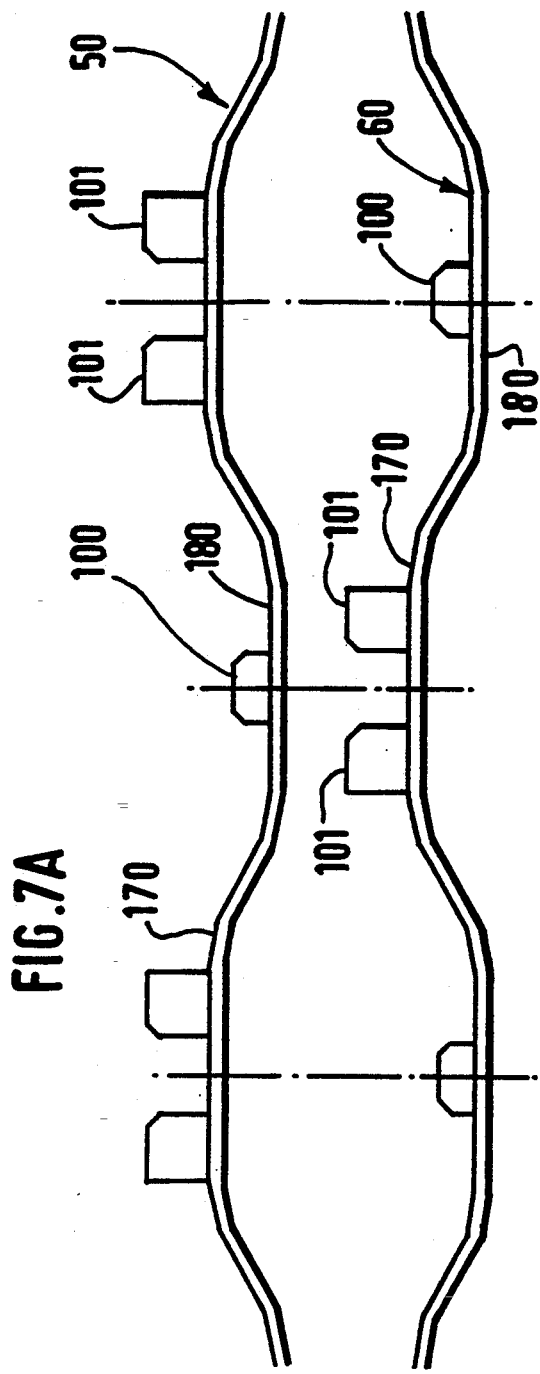

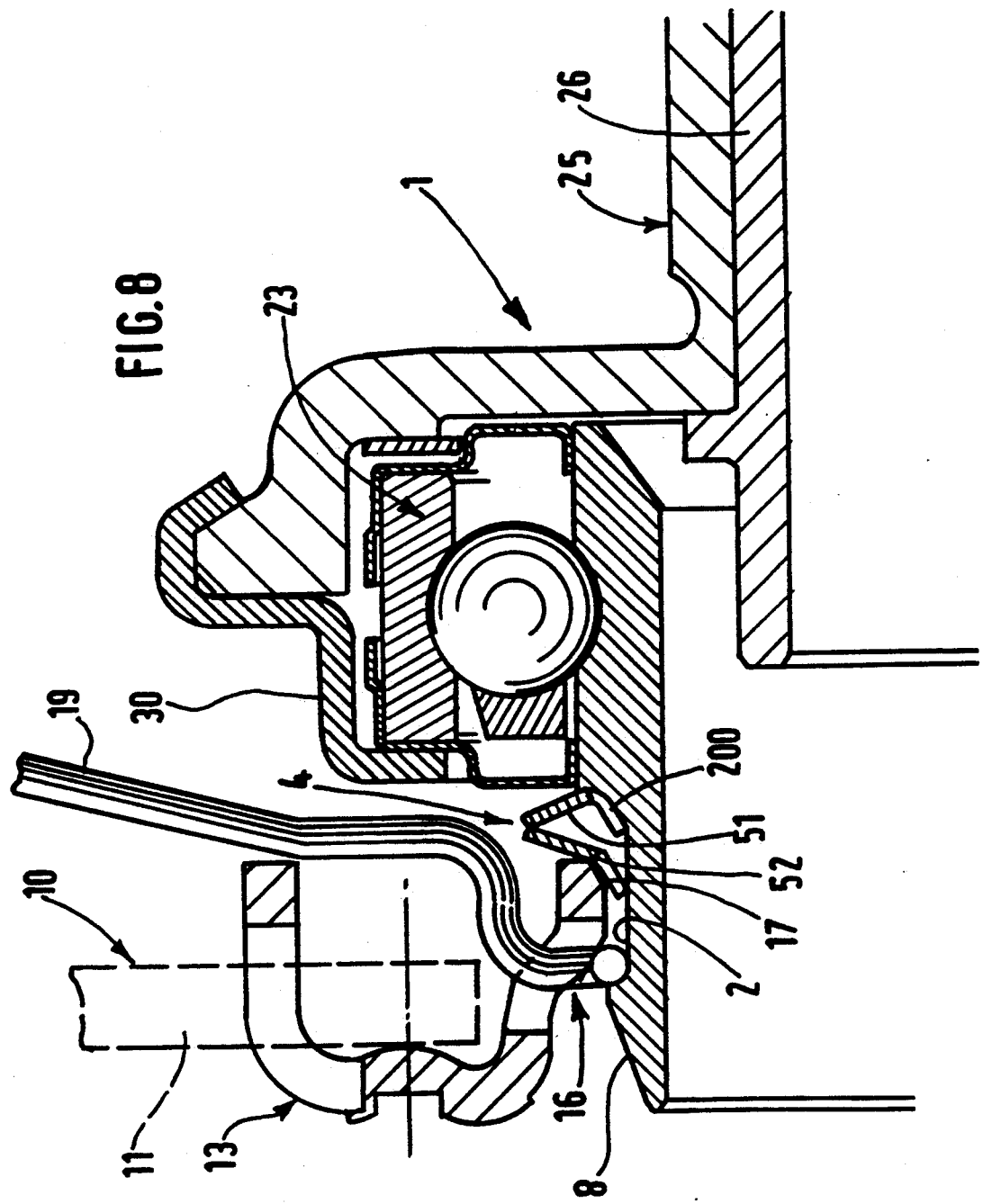

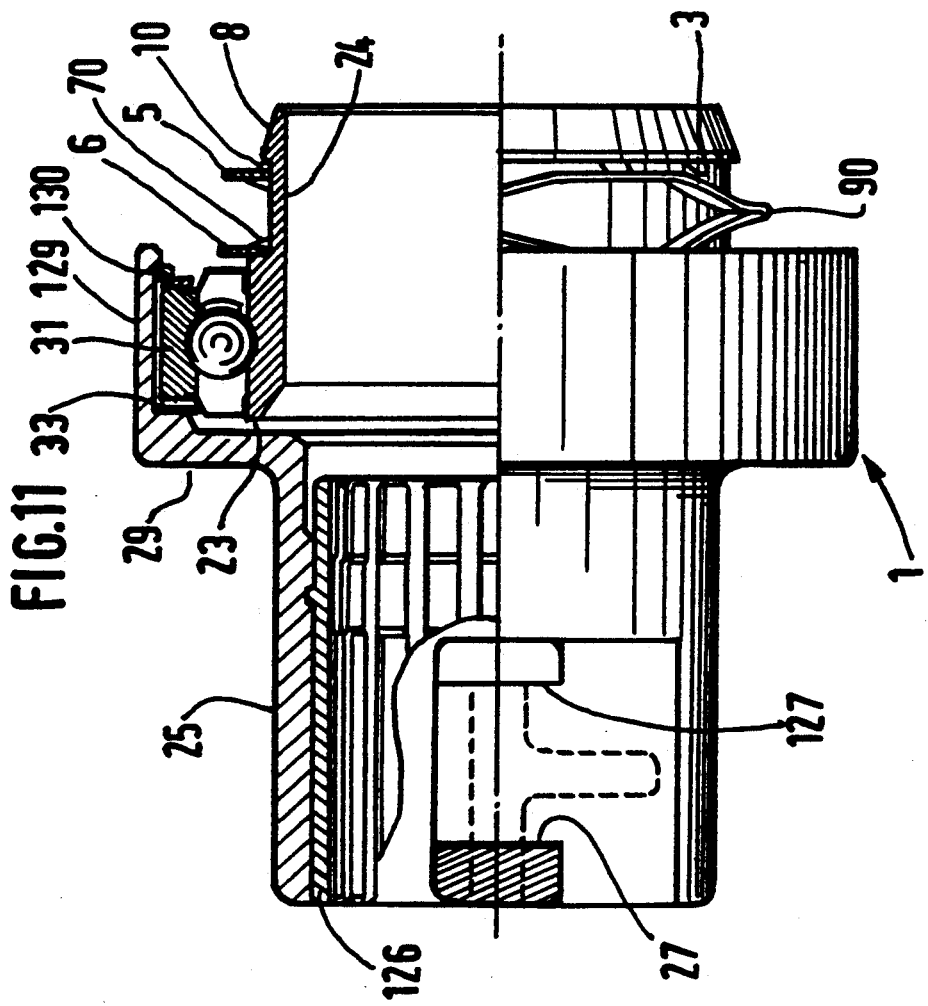
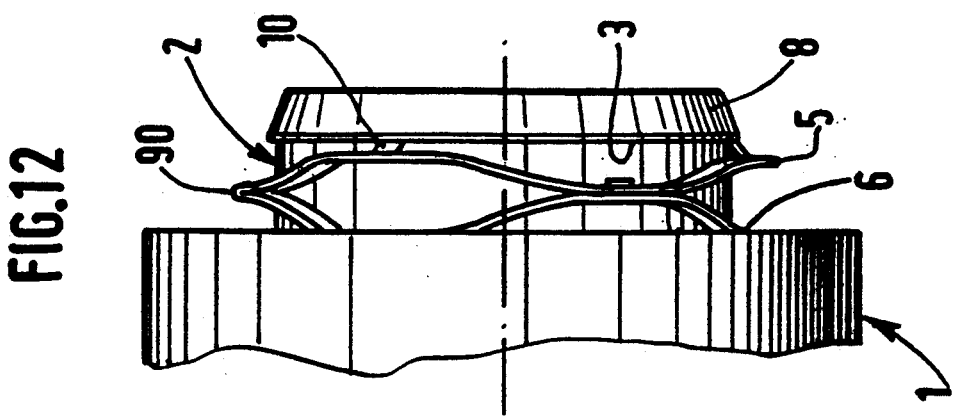

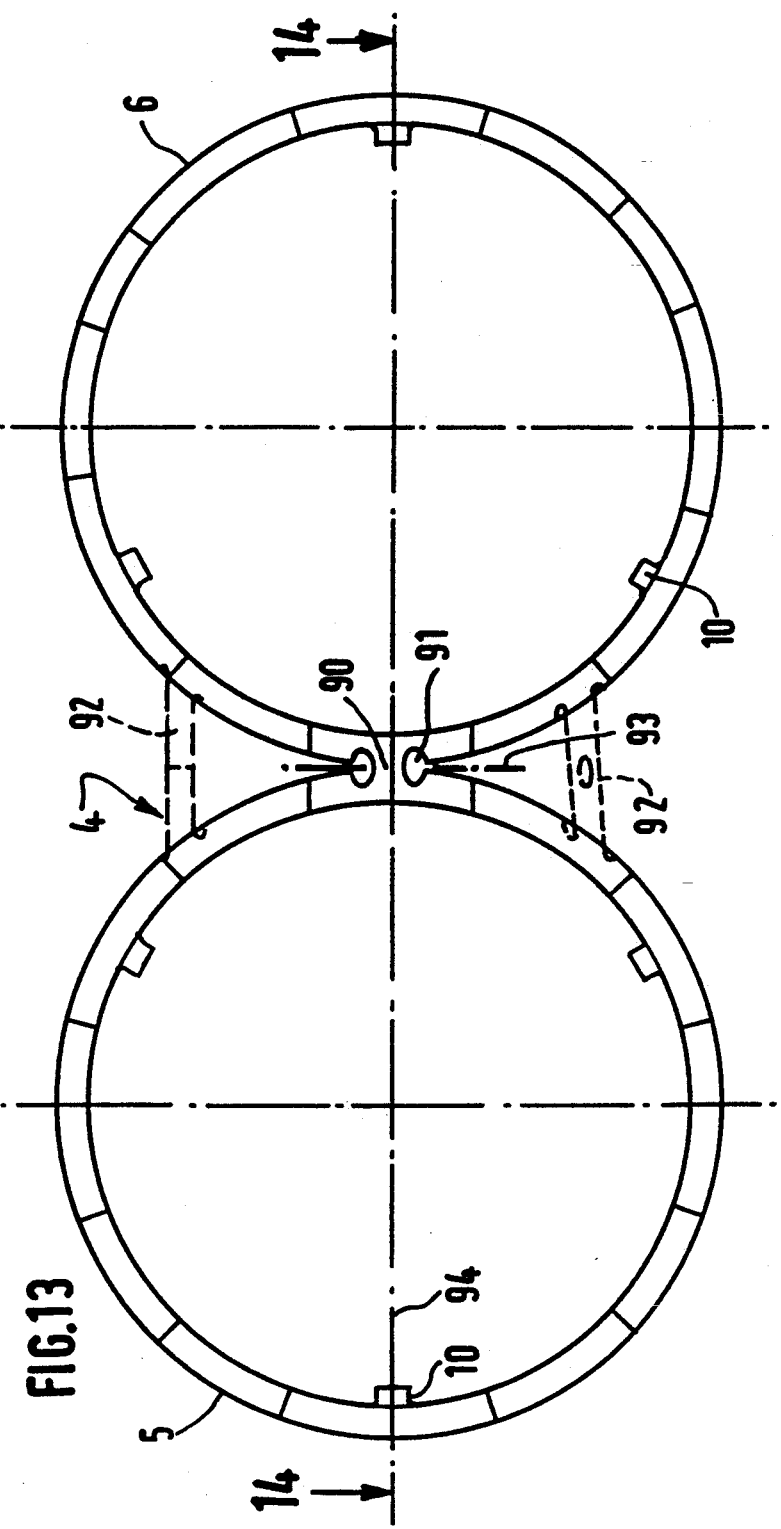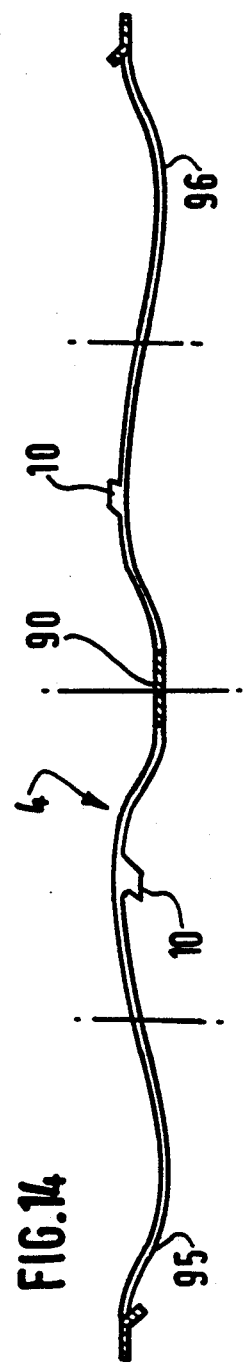
FIG.13
FIG.14

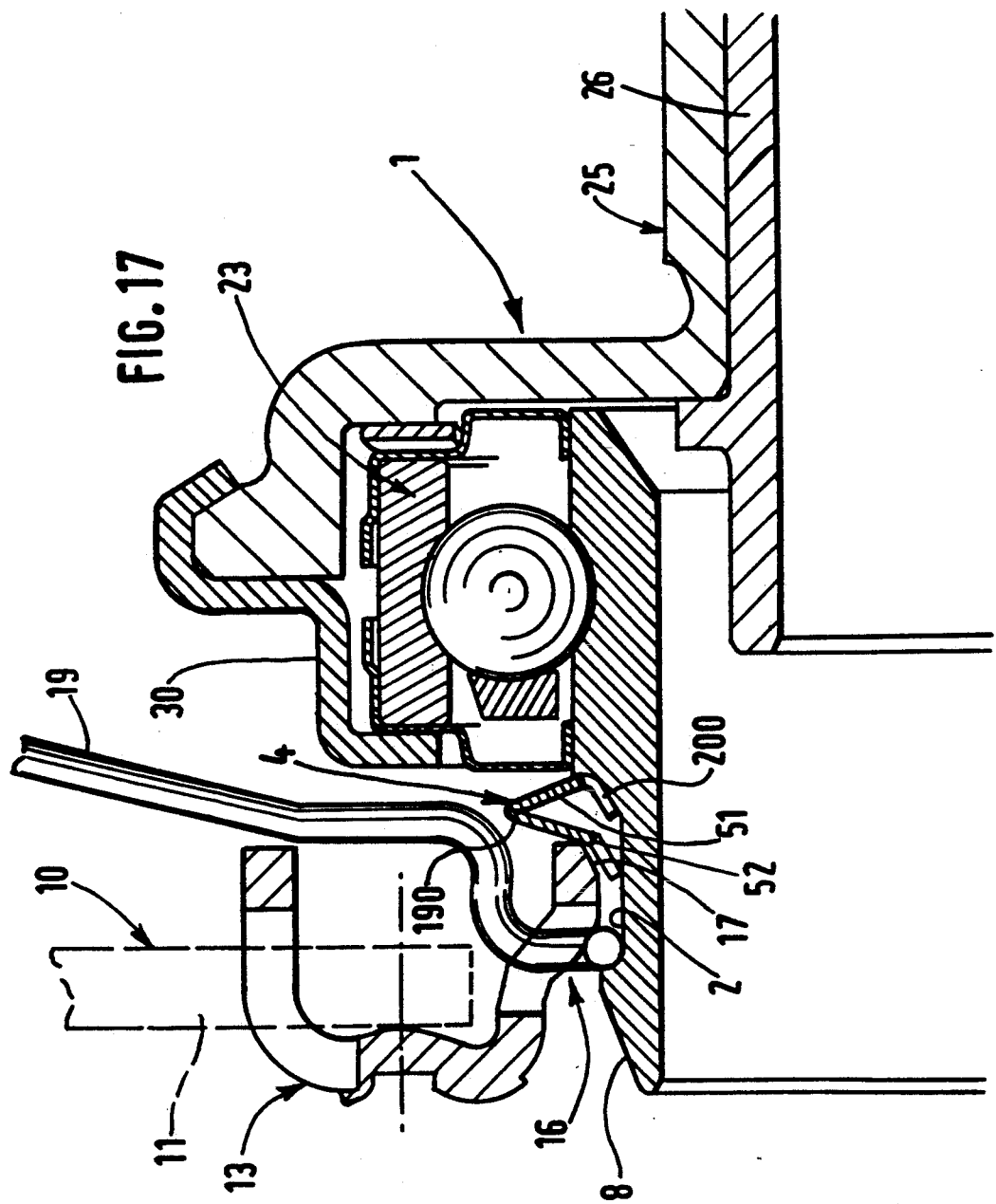

CLUTCH RELEASE BEARING ASSEMBLY, ESPECIALLY FOR A MOTOR VEHICLE

FIELD OF THE INVENTION

The present invention relates generally to a clutch release bearing assembly, especially though not exclusively for a motor vehicle. In particular, it relates to such an assembly of the kind comprising: a clutch release bearing having an actuating element which is formed with an actuating nose, adapted to act in traction on the inner face of a declutching means of a clutch (for example a clutch diaphragm) through a connecting piece, which is prefitted on the clutch diaphragm or other declutching means; a coupling member which is resiliently deformable in the radial direction, and which is carried internally by the connecting piece so as to couple the connecting piece in traction to the actuating element; and resilient retaining means which act axially between the actuating element and the connecting piece, so as to retain the coupling member permanently between a drive surface, which is defined on the internal bore of a sleeve portion of the connecting piece, and an actuating flank or thrust shoulder of a groove which is formed on the actuating nose of the actuating element, with the nose penetrating into the interior of the sleeve portion of the connecting piece.

BACKGROUND OF THE INVENTION

An assembly such as that defined above prevents any detachment of the clutch release bearing from the connecting piece, and reduces wear in connection with the coupling member. This assembly is disclosed in the specification of U.S. Pat. No. 4,667,800 and the corresponding French published patent application FR 2 544 035A, in which a corrugated retaining spring is incorporated in a prefitted sub-assembly consisting of the connecting piece and the declutching means of the clutch.

When this sub-assembly is engaged radially with the exterior of the actuating element, this arrangement makes it necessary to modify the connecting piece. In practice this involves either the modification of the sleeve portion of the connecting piece, so that the latter then has a plurality of axial lugs, formed with a groove in which the retaining spring can be engaged, or the addition of a support collar to the connecting piece for carrying axial lugs which are formed for this purpose from place to place around the perimeter of the retaining spring.

This last mentioned arrangement is particularly disadvantageous, because it results in the connecting piece being weakened. In addition, the retaining spring is unable to be made as large in the radial dimension as is desirable.

DISCUSSION OF THE INVENTION

An object of the present invention is to overcome the above mentioned drawbacks by providing, in a simple and cost-effective manner, a novel clutch release bearing assembly having resilient retaining means, without increasing the size of the connecting piece and without having to make any significant modification to the latter.

According to the invention, a clutch release bearing assembly, especially for motor vehicles, of the kind comprising: a clutch release bearing having an actuating element defining an actuating nose, adapted to act in traction on the inner face of a declutching device of a clutch (for example a diaphragm) through a connecting piece prefitted on to the said declutching means; a coupling member which is elastically deformable radially and which is carried internally by the connecting piece for coupling the connecting piece in traction to the actuating element; and resilient retaining means which act axially between the actuating element and the connecting piece, so as to retain the coupling member permanently between a drive surface formed on the internal bore of a sleeve portion of the connecting piece and an actuating flank or thrust shoulder of a groove formed on the actuating nose of the actuating element and penetrating into the interior of the sleeve portion of the connecting piece, is characterized in that the groove of the actuating nose of the actuating element is elongated on the side opposite to the actuating flank, so that at least one axially acting resilient ring (referred to as a resilient retaining ring), constituting the resilient retaining means, can be fitted in advance in the groove, and in that the actuating flank constitutes an abutment for the said resilient ring before the clutch release bearing is attached to the connecting piece.

In an assembly according to the invention, therefore, the (or each) resilient ring is incorporated in the actuating element, and the flanks of the groove form natural abutments for retaining the ring itself on the clutch release bearing. The resilient ring or rings cannot therefore become detached and lost. Preferably the ring, or each ring, is mounted in advance, without any clearance, between the two flanks of the groove.

The actuating flank, or thrust shoulder of the groove, thus serves the additional purpose of retaining the resilient ring against loss. In addition, the connecting piece is by and large unchanged, although the length of its sleeve portion may be reduced.

In addition, the mechanical strength of the connecting piece is preserved, while the resilient ring may have a radial dimension as large as may be required, especially with a view to obtaining high precision in the gripping force involved in retention. Thus, in accordance with a preferred feature of the invention, the outer diameter of the resilient ring is greater than the outer diameter of the free end of the sleeve portion. This ensures that, during assembly, the sleeve portion will come into contact with the resilient ring, which accordingly offers a large surface area for contact with the sleeve portion.

It will be appreciated that the arrangement in accordance with the invention is also inexpensive as regards the actuating element, because that leads to elongation of the groove of the latter without any increase in the length of the actuating nose.

This arrangement is of universal application, the connecting piece being able to be prefitted in any suitable way on to the diaphragm or other declutching member of the clutch.

In addition, in the case where the coupling member consists of a ring having finger elements hooked over each other in the manner described in the specification of French patent application FR 2 630 174A, the resilient ring arranged in accordance with the present invention can easily be accommodated in the free space which is defined by the finger elements, while still having a large radial dimension.

In every case it can be confidently assumed that separation of the clutch release bearing from the connecting piece will not occur, even when the preloading force, which is normally exerted permanently on the clutch release bearing in a direction away from the clutch diaphragm (for example with the aid of a spring acting on the declutching fork) is removed, either momentarily or otherwise. The same is true in the event of any rocking movement of the connecting piece with respect to the clutch release bearing.

According to another preferred feature of the invention, it is possible to fit at least two axially acting resilient rings, constituting the resilient retaining means in advance in the elongated groove of the actuating nose, the resilient rings being mounted so as to act in series relationship between the free end of the sleeve portion of the connecting piece and the inner flank of the groove.

This arrangement enables an additional problem to be overcome. Thus, where there is a single resilient ring as in the specification of French published patent application FR 2 544 035A, the axial movement involved during the snap fitting operation during assembly is quite substantial. Accordingly, in order to be sure that fitting has taken place correctly by simple snap fitting of the clutch release bearing, it is necessary to effect some degree of over-travel, thus compressing the resilient retaining member even more. This does however involve a risk of damaging the resilient retaining member, by over-stressing it so that its elastic limit may be exceeded.

In order to overcome this disadvantage, it is possible to resort to an arrangement with resilient means in the form of two resilient rings mounted in series. Such an arrangement with springs in series enables them to bend cumulatively for a given force. It permits easy snap-fitting of the clutch release bearing with a degree of over-travel, but is impossible to achieve with a construction of the kind disclosed in the above mentioned document FR 2 544 035A. It is therefore necessary to insert the resilient rings at the outer periphery of the connecting piece, in the manner disclosed in the specification of French published patent application FR 2 629 882A.

However, even that arrangement is not entirely satisfactory, because it involves, firstly, the modification and elongation of the connecting piece at its outer periphery, in order to fit the resilient rings, and secondly, the sliding fitting of a thrust piece on the actuating element, this thrust piece being in engagement on a circlip which is carried by the actuating element. The number of components is thus increased.

Thanks to the above mentioned feature in which the number of components is minimized without altering the connecting piece, advantage can be taken of a series of resilient rings which enable the clutch release bearing to be assembled, by snap-fitting action, on to the sub-assembly consisting of the connecting piece and the coupling member, with a substantial travel and an adequate over-travel. In addition, besides being easy, this assembly operation can be carried out with a precisely determined force and such that there is no longer any risk of damage occurring to the resilient rings.

In accordance with a further preferred feature of the invention, the (or each) resilient ring has retaining means at its outer periphery, for example lugs which are inclined towards the actuating flank or thrust shoulder of the groove, in order to retain the ring or rings in the groove. These retaining means permit centring of the resilient ring or rings so that they cannot become detached and lost. In addition, in the case in which the lugs are inclined (i.e. inclined to the axis of the clutch release bearing), fitting of the ring or rings on the actuating nose is easy without there being any need to have regard to precise manufacturing tolerances. In practice this fitting can be carried out by a simple axial insertion operation, with the lugs flexing until they enter into gripping engagement in the groove. These inclined lugs also enable the resilient rings to be continuously centred during operation.

The inclination of the lugs is preferably made substantially equal to the inclination (with respect to the axis of the assembly) of the engagement surface formed at the free end of the sleeve portion of the connecting piece. This facilitates the snap-fitting assembly operation, because the connecting piece is then centred with respect to the appropriate resilient ring during fitting. In addition, any tilting of the resilient ring is avoided.

Preferably, the inner flank of the groove consists of a radial outer portion which is joined to an inner portion (i.e. a portion radially inward of the outer portion), this inner portion being generally inclined to the axis in such a way that it snugly engages the shape of the resilient ring or rings. This arrangement defines a seating for the resilient retaining ring or rings. This in turn increases the mechanical strength of the actuating nose, the internal portion being adapted to the shape of the inclined lugs of the associated resilient retaining ring or rings. There may be two of these resilient rings, mounted in back to back relationship. They may be of the corrugated kind. In that case, indexing means are provided for indexing the rings circumferentially, and also prevent the latter from rotating with respect to each other.

The two resilient rings may be identical to each other, in which case it is sufficient to offset one ring circumferentially with respect to the other, in such a way that the troughs of the corrugations of one ring are in contact with the peaks of the corrugations of the other ring. The rings are then held in place by the indexing means, which guarantees that they are mounted in series; otherwise the rings would become interlocked with each other and would no longer act in series.

The indexing means may consist in securing the rings together in their contact zones by adhesive means or by welding. In a modification, the indexing means may comprise a separate baffle ring which is interposed between the corrugated rings, so as to guarantee the series mounting of the latter.

In yet another modification, lugs may be provided which interlock with each other at the nodes or zones of contact between the rings. The invention also enables Belleville rings to be used, these rings having internal retaining and centring lugs. Such Belleville rings are then mounted so that they are inclined in opposite directions.

All of these embodiments are applicable to an assembly having two separate retaining rings, but this does increase the number of components which it is necessary to stock. In addition, it can happen that two rings will become nested together, during storage, in such a way that it is possible for inadvertent mounting in series to occur in which one ring is fitted together with two rings that are nested together. This of course alters the mounting conditions and the forces which are exerted by the rings in operation of the assembly.

In addition, the increase in overall thickness of the rings under these circumstances can make the snap-fitting of the clutch release bearing to the connecting piece impossible, since another effect is to limit the relative travel during the fitting operation.

Thus, according to another preferred feature of the invention, a clutch release bearing assembly according to the invention is further characterized in that the two resilient rings are joined together by at least one connecting and indexing lug so as to form a single component or unitary assembly, the connecting lug being integral with the two rings. This single component cannot become detached and lost, and of course the number of components that have to be stocked is also reduced. The danger of an error such as described above occurring is now avoided, because no additional ring would be able to become nested or interlocked with one of the rings. The component is easy to handle and transport.

In addition, the connecting lug naturally provides a means for preventing relative rotation between the two rings, and also provides automatic circumferential indexing of one ring with respect to the other.

The resilient rings when joined together in this way, may be identical in shape, and no angular offset need be provided between one ring and the other. Thus the two rings are arranged in head to toe, or mirror image, relationship, after which the connecting lug is bent about a transverse axis of symmetry of the connecting lug. It is not necessary to apply any adhesive or carry out any welding, and this reduces the manufacturing costs. The single component can easily be made by stamping out in a press followed by press forming and bending of the connecting lug. No additional lug need be provided, and this simplifies the rings themselves.

Assembly is also simplified due to the absence of these additional lugs, previously leading to an assembly operation which involved relative rotation of one of the rings with respect to the other and fitting of additional lugs of different lengths within each other. The arrangement also avoids the need to provide any baffle ring.

This arrangement has very wide application. Thus the resilient rings may consist of corrugated rings, or in a modification, Belleville rings, attached to each other in the same way. Preferably, weakening means are associated with the connecting lug, in order to facilitate bending of the latter.

It should however be stressed that the invention is not confined to the case where a pair of resilient rings are joined together.

Various preferred embodiments of the invention will be described below by way of example only, and with reference to the accompanying drawings.

BRIEF DESCRIPTION OF THE DRAWINGS

FIGS. 7A and 7B are simplified views of the mounting of the resilient retaining rings of FIG. 6, showing the relationship between them before and after being fitted, respectively.

FIG. 8 is a half view in axial cross section, showing a clutch release bearing assembly in yet another embodiment of the invention.

FIG. 11 is a view of a clutch release bearing with its upper part shown in cross section, prefitted with a unitary assembly of resilient retaining rings, in a further embodiment of the invention.

FIG. 12 is a scrap view in elevation showing part of the same clutch release bearing as in FIG. 11.

FIG. 13 is a view in elevation of the unitary assembly seen in FIGS. 11 and 12, before being bent.

FIG. 14 is a view in cross section taken on the line 14—14 in FIG. 13.

FIG. 17 is a half view in axial cross section showing a clutch release bearing assembly which includes yet a further embodiment of the unitary assembly.

DESCRIPTION OF PREFERRED EMBODIMENTS OF THE INVENTION

Figure 1:
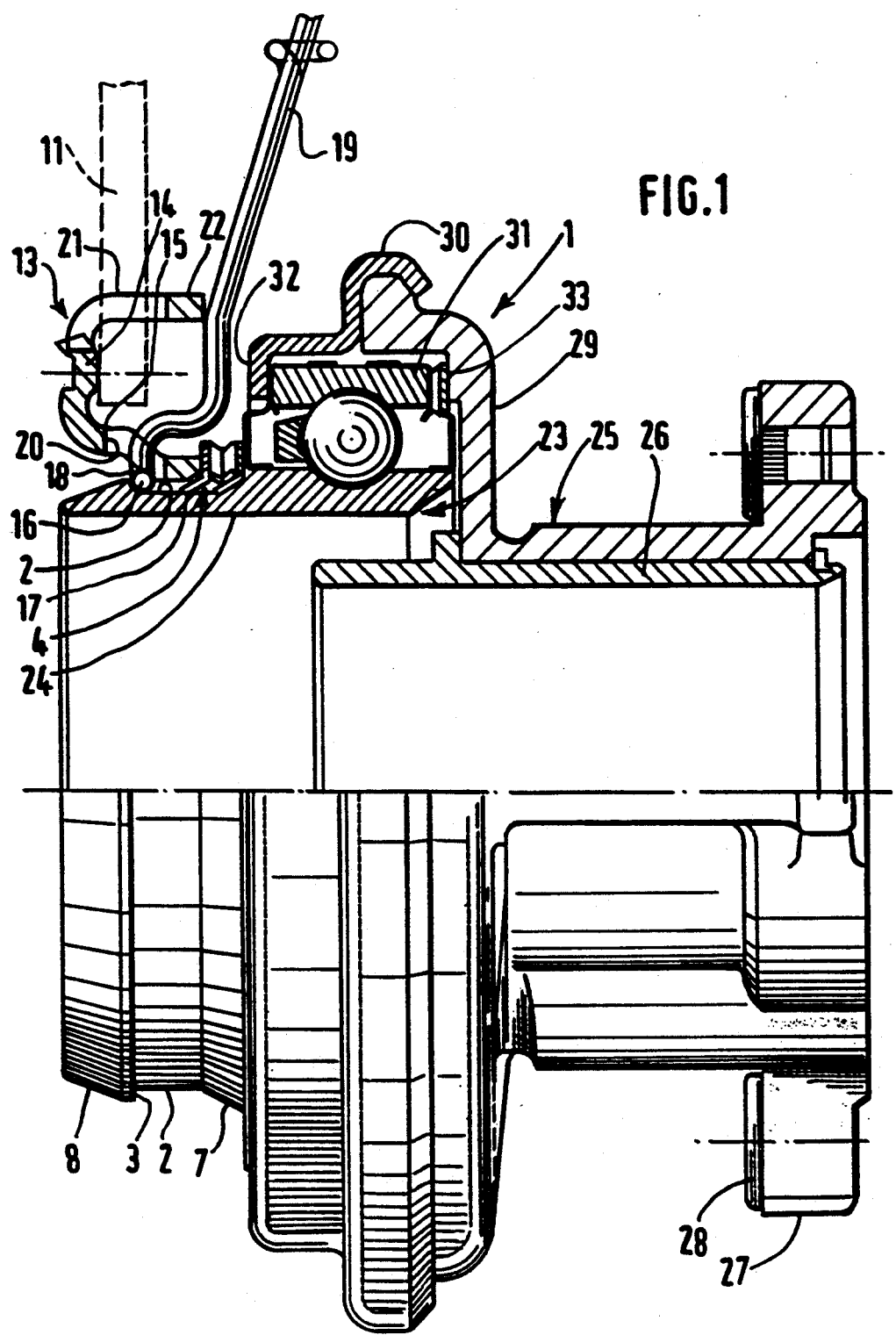
FIG. 1 shows a clutch release bearing assembly in accordance with the invention, with the upper part of the Figure being a view in axial cross section, while its lower part is an axial elevation of the clutch release bearing without its coupling member.

As shown in the drawings, a clutch release bearing 1 is attached to the declutching member 11 of a clutch in snap-fitting relationship. In this example the declutching member 11 comprises the fingers of a clutch diaphragm which is open in the centre. The clutch release bearing acts in traction on the declutching member 11 so as to disengage the clutch.

A connecting piece 13 is carried on the free ends of the fingers 11 of the clutch diaphragm for the purpose of attaching the clutch release bearing 1 to the latter. The connecting piece 13 is annular in shape and in this example it is made of pressed sheet metal. This connecting piece 13, also referred to as a striker cup, comprises a radial collar portion 14 for acting on the inner face of the diaphragm fingers 11, together with an axially extending, central sleeve portion 15 which is integral with the collar portion 14. The collar portion 14 lies on the same side as the inner face of the diaphragm fingers 11, i.e. on the opposite side of the latter from the clutch release bearing 1. The sleeve portion 15 carries an annular coupling member 16 which extends into the sleeve portion 15.

The coupling member 16 is resiliently deformable in the radial direction, and is adapted for the attachment of the clutch release bearing 1 by simple snap-fitting of the latter, at least in the axial direction considered from the collar portion 14 towards the coupling member 16 (i.e. in the direction of disengagement of the clutch by traction). This attachment is carried out in a known manner by bringing towards each other a primary block and a secondary block, in which the primary block is fixed with respect to the engine of the motor vehicle and includes the clutch together with the assembly consisting of the connecting piece 13 and coupling member 16. The secondary block consists of the gearbox of the vehicle together with the clutch release bearing, the latter being carried by the gearbox.

In this example, the collar portion 14 is curved for its local engagement on the inner ends of the diaphragm fingers 11, while the axially oriented sleeve portion 15 passes through the central aperture in the diaphragm. The collar portion 14 also includes a frusto-conical surface 17 at its free end closest to the clutch release bearing 1, for engagement with the latter, together with a shoulder 18 which is defined by a change in diameter in the bore of the sleeve portion 15.

The coupling member 16 is fitted radially between the clutch release bearing 1 and the connecting piece 13, being carried internally by the latter. In this example the coupling member 16 is in the form of a radially resilient ring, having a circular transverse contour which is open between two finger portions 19, each of which passes through an aperture 20 in the sleeve portion 15, to define, radially beyond the sleeve portion 15, gripping means. It should be noted that the coupling member 16 may take a modified form, for example a simple ring as disclosed in the specification of French published patent application No. FR 2 629 822A, or a split resilient ring (which is preferably chamfered), mounted in a groove formed in the sleeve portion 15.

The ring 16 also has two toe portions which cooperate with the finger portions 19, for retaining the ring 16 with respect to the sleeve portion 15. Each of these toe portions engages with an aperture as is disclosed in the specification of French published patent application No. FR 2 630 174A. The finger portions are thus hooked resiliently on to each other in such a way that the coupling ring 16 is closed circumferentially on to itself under precompression. Thus, in order to release the clutch release bearing, all that is necessary is to unhook the two finger portions 19.

The connecting piece 13 is preassembled on to the fingers 11 of the diaphragm. Retaining means 21 are provided for this purpose, and are so arranged that, together with the collar portion 14, they retain the connecting piece 13 in position on the diaphragm fingers 11. In this example the retaining means 21 are in the form of retaining fingers which project from the outer periphery of the axially extending collar portion 14, and pass through the slots which separate the diaphragm fingers 11 from each other. The retaining fingers 21 carry circumferential retaining finger elements 22 defining a retaining shoulder parallel to the collar portion 14, as disclosed in the specifications of U.S. Pat. No. 4,613,027 and French published patent application No. FR 2 544 036A.

In a modification, the retaining fingers 21 may carry a Belleville ring at their free ends, with the diaphragm fingers 11 being gripped between this Belleville ring and the collar portion 14. This particular arrangement is disclosed in the specification of French published patent application No. FR 2 630 174A.

In a further modification, a corrugated resilient ring may be used, with this ring extending in facing relationship to the collar portion 14 so as to be hooked on the latter by means of axial fingers passing through the diaphragm, these fingers being formed on the corrugated ring.

The clutch release bearing 1 includes an actuating element 23 and a manoeuvring element 25. The actuating element 23 comprises a ball bearing, and in this example the inner ring 24 of this bearing is extended by a sufficient amount to penetrate into the interior of the sleeve portion 15. The bearing 23 is carried by the manoeuvring element 25. Its rotating inner ring 24 then constitutes a forwardly projecting actuating nose of the actuating element 23.

The actuating element 23 is adapted to act in traction on the inner face of the declutching member of the clutch (i.e. the diaphragm fingers 11) through the connecting piece 13. To this end, the actuating element 13 is formed with a groove 2 for receiving the coupling member 16 as will be described more fully below. The manoeuvring element 25 in this example is in the form of a sleeve which carries an internal sleeve 26 of antifriction material for sliding along a guide tube (not shown), which is fixed to the gearbox.

The sleeve 26 is shouldered, and has at one of its ends a groove for receiving a circlip by which it is located axially in the manoeuvring element, or manoeuvring sleeve (FIG. 1). The manoeuvring sleeve 25 is arranged to be manoeuvred by means of a declutching fork, and for this purpose it has two lugs 27 extending transversely at its rear end. Each manoeuvring lug 27 carries a wear resistant pin 28 having a broad head, which can clearly be seen in FIG. 1, overlying the annular radial face of the lug 27 which faces towards the clutch diaphragm. The fingers of the declutching fork act on the heads of the pins 28. At its front end, the manoeuvring sleeve 25 has an annular radial flange 29.

In this example the clutch release bearing 1 is automatically centred, and a metal shroud 30 secures the manoeuvring sleeve 25 axially to the non-rotating outer ring 31 of the bearing 23. The shroud 30 includes an upset edge 32 which extends radially inwardly, and is swaged on to a circumferential terminal bead of the flange 29 as can be seen in Figure 1. An axially acting resilient ring 33 (which in this example is a corrugated ring, but which may in a modification consist of a Belleville ring) bears against the flange 29 and on the corresponding edge face of the outer ring 31 of the bearing, so as to urge the opposite edge of the ring 31 into contact with the upset edge 32 of the shroud. The shroud 30 surrounds the outer ring 31 of the bearing, defining a radial clearance between them, in known manner, so that the bearing 23 can be displaced and so that the automatic centring of the clutch release bearing 1 can take place.

The rotating ring 24 of the actuating element or bearing 23 is, as has been mentioned above, formed with a groove 2 for receiving the coupling member 16. The groove 2, which is formed on the actuating nose of the element 23, has an outer or actuating flank in the form of a thrust shoulder 3 (see FIGS. 2 and 3).

Once the clutch release bearing has been snap-fitted on to the connecting sub-assembly which consists of the connecting piece 13 together with the coupling member 16, the clutch release bearing 1 is adapted for acting in traction, through its actuating element 23, on the internal face of the clutch diaphragm fingers 11 through the connecting piece 13, with the coupling member 16 being held between the thrust shoulder 3 and the shoulder 18 of the sleeve portion 15. The shoulder 18 defines a drive surface which in this example is frusto-conical in shape. In the present example the coupling member 16 is held permanently between the thrust shoulder 3 and the drive surface 18, by means of resilient retaining means 4. Accordingly, the clutch release bearing 1 is attached to the connecting piece 13 in both axial directions, by being coupled to it in traction through the coupling member 16.

Figure 3:
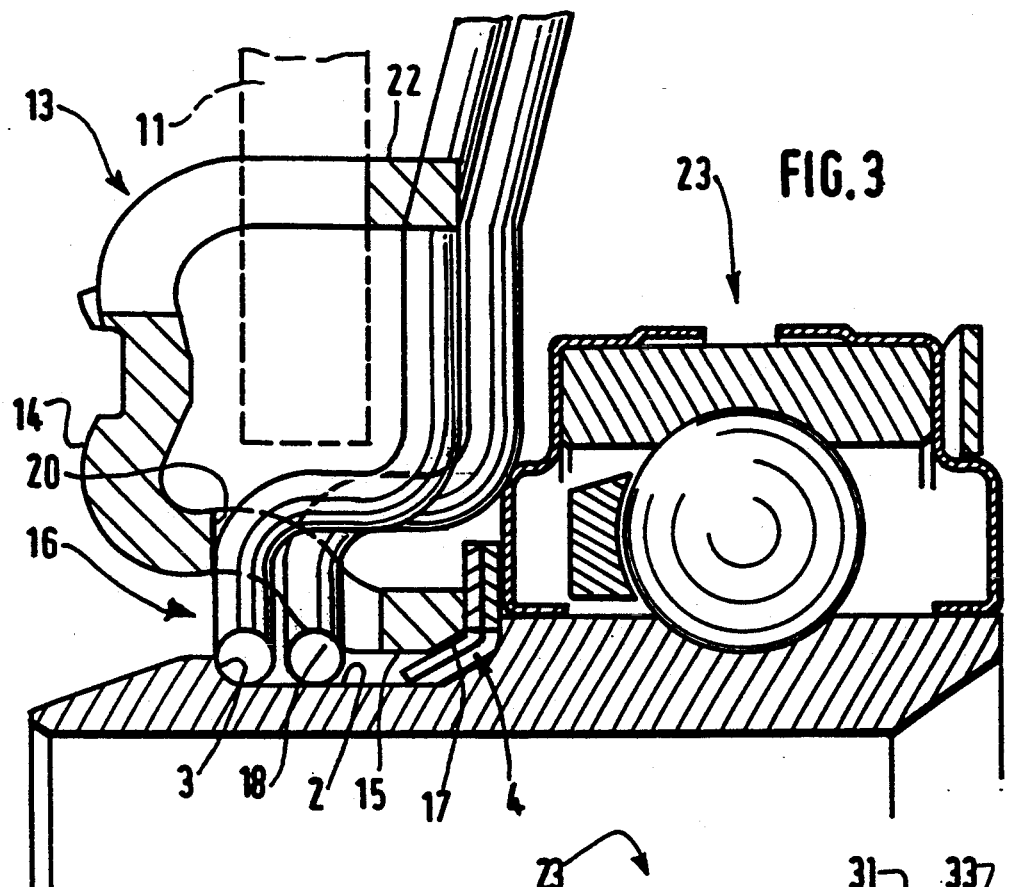
FIG. 3 is a view in cross section of the bearing shown in FIG. 2, during its snap-fitting to the connecting piece, with the coupling member being shown in various positions.
Figure 2:
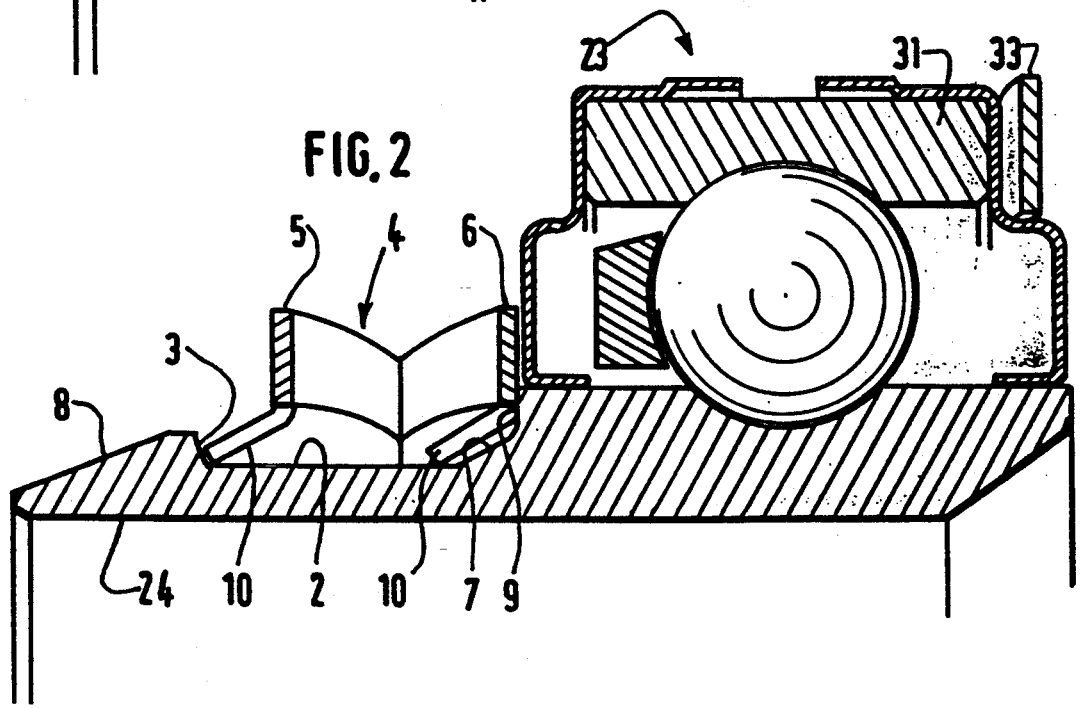
FIG. 2 is a half view of the clutch release bearing, shown in cross section on a larger scale, without its manoeuvring sleeve or its shroud, and before snap-fitting of the clutch release bearing.

In the clutch release bearing described above, the groove 2 on the actuating nose 24 of the actuating element 23 is elongated in the direction away from its thrust shoulder 3, i.e. towards the right in FIGS. 1 to 3, for the prefitting of at least one axially acting resilient ring 5, 6 in the groove 2. The ring or rings 5, 6 constitute the resilient retaining means 4, while the thrust shoulder 3 constitutes a surface for engagement of the ring or rings 5, 6 before the latter are fitted.

It will be appreciated that the elongation of the groove 2 involves an inexpensive operation, which does not add to the complexity of the actuating element 23; nor does it require any operation to elongate the latter. In Figures I to 4, the elongation of the groove 2 away from its thrust shoulder 3 enables two axially acting resilient rings 5, 6 (or more than two), mounted in series, to be fitted in this groove.

Once the clutch release bearing 1 has been fixed with respect to its connecting piece 13, the rings 5 and 6 act between the end surface of the sleeve portion 15 and the inner (i.e. right hand in FIGS. 2 and 3) flank 7, 9 of the groove 2, at the other end of the latter from the thrust shoulder 3, with the ring 5 bearing against the free end of the sleeve portion 15. Thus, during the snap-fitting of the clutch release bearing 1 by bringing together the primary and secondary blocks described above, the nose 24 penetrates into the sleeve portion 15 while at the same time opening the coupling ring 16.

To this end, the front end of the ring 24 has a profile, as indicated at 8, such as to enable it to penetrate. In this example the profile at 8 is frustoconical. This is joined to a guide surface which is arranged to cooperate with the portion of the internal bore of the sleeve portion 15 that has a reduced diameter. This cylindrical guide surface is joined to the groove 2, the thrust shoulder 3 of which is semicircular in order to match the shape of the ring 16. However, it is possible to invert these structures, with the thrust shoulder 3 being frustoconical in shape and the drive surface 18 being semicircular so as to match the shape of the ring. All this depends on the configuration of the connecting piece.

The inner flank 7, 9 of the groove consists of a transverse outer end or portion 9 and an inclined inner end or portion 7, the latter being inclined towards the thrust surface 3 and being joined to the outer end portion 9 through a bend. This arrangement enables the flank 7, 9 to match the shape of a set of inclined lugs 10, which are formed on the inner periphery of each ring 5, 6 in a manner to be described below.

It will be appreciated that advantage is taken of the configuration of the inner ring of the ball bearing 23, which has a change of diameter. Thus the outer portion 9 is in this example defined by this change in diameter, and extends radially beyond the thrust shoulder 3. Accordingly, while the clutch release bearing and connecting piece are being brought towards each other, for example in the usual way by means of the declutching fork, with the latter engaging on the flange 29 (the linkage that couples the declutching fork to the clutch pedal being disconnected), the front end 8 of the actuating nose 24 will always be guaranteed to penetrate into the engagement surface 17 of the sleeve portion 15. As the movement is continued, the engagement surface at the free end of the sleeve portion 15 comes into contact with the ring 5, while the frusto-conical profile 8 at the front end of the nose 24 comes into contact with the coupling ring 16.

FIG. 3 shows the situation on further continuation of the movement. Here, the rings 5 and 6, together with the resilient ring 33, become compressed by the free end of the sleeve portion 15, and this forces the coupling ring 16 to open. The movement stops when the two rings 5 and 6 are fully compressed, and it is this condition that is shown in FIG. 3. The rings 5 and 6 subsequently return the coupling ring 16 to its rearward position, and cause the latter to become held automatically between the thrust shoulder 3 and the drive surface 18.

It will be appreciated that in this way, it is possible to effect a degree of over-travel, so as to provide a generous travel in the axial movement which ensures that the snap-fitting engagement will take place with absolute certainty. Most preferably, the outer diameter of the rings 5 and 6 is greater than the outer diameter of the free end of the sleeve portion 15, so as to make absolutely certain that the rings 5 and 6 are compressed by the sleeve portion 15. In this example each of the rings 5 and 6 exerts the same load.

Each of the rings 5 and 6 has retaining means at its inner periphery. This may for example consist of fingers carried on the inner periphery of the rings 5 and 6, but in this example these retaining means are in their preferred form, consisting of lugs 10 which are inclined towards the thrust shoulder 3. These lugs grip, preferably lightly, against the base of the groove 2, and are formed integrally with the respective rings 5 and 6 so as to project from the inner periphery of the latter. A radius is formed in the root zone of each of the inclined lugs 10, where it joins the body of the corresponding ring 5 or 6. It will be realized that these inclined lugs 10 are resilient, and that they enable the rings 5 and 6 to be center during operation, so that the rings have an automatic centering facility. In a modification, the lugs 10 may project substantially at right angles to the radial direction.

Accordingly, and with reference to FIG. 2, before the clutch release bearing 1 is fitted on to the connecting piece 13, the rings 5 and 6 are positively retained and centred in the groove 2. These rings are preferably fitted in advance, that is to say before the clutch release bearing 1 is fitted to the connecting piece 13. They are preferably fitted without any clearance and in a precompressed state, between the two flanks of the groove 2, i.e. between the thrust shoulder 3 and the inner flank 7, 9. This avoids any risk of the rings becoming detached. The retaining lugs 10 of the ring 5 bear against the thrust shoulder 3, while those of the ring 6 fit snugly against the inclined portion 7 and radial shoulder 9 of the inner flank of the groove. This arrangement renders the rings 5 and 6 stable, and enables them to be fitted by simply threading them axially over the actuating nose 24, with the lugs 10 flexing naturally by contact with the front end profile 8 of the nose so as subsequently to pass into the groove 2. In addition, the ring 5 slides easily during the fitting operation.

It will be appreciated that the inclination of the lugs 10 is generally equal to the inclination of the engagement surface 17 (with respect to the axis of the assembly in both cases). Mutual centering of the ring 5 with the sleeve portion 15 therefore takes place during the fitting operation. Tilting of the rings 5 and 6 is prevented by the cooperation of the ring 6 with the inner flank 7, 9, both during fitting and in operation.

Figure 4:
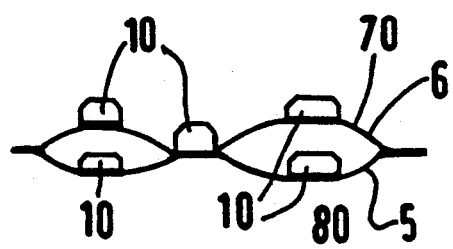
FIG. 4 is a simplified view showing the mounting of the resilient retaining rings in the arrangement of FIGS. 1 to 3.

In the embodiment shown in FIGS. 1 to 4, the resilient rings are in the form of corrugated rings arranged in back to back relationship as shown diagrammatically in FIG. 4. The lugs 10 project from the peaks and troughs of the corrugations of the rings 5 and 6, and these peaks and troughs are flattened for this purpose. More precisely, the rings 5 and 6 are mounted back to back and in contact with each other, and are identical to each other. One of the rings is offset circumferentially with respect to the other, so that the peak of each corrugation of either one of the rings make contact with a corresponding trough of a corrugation in the other ring. This contact is enhanced by the flattening, mentioned above, of the troughs and peaks so as to define good, flat zones of contact between each ring and the other, the peaks 70 of one ring being offset so as to bring them into contact with the troughs 80 of the other ring.

In a modification the rings, which are identical, may be provided with the lugs 10 only on their peaks or only in their troughs.

Figure 5:
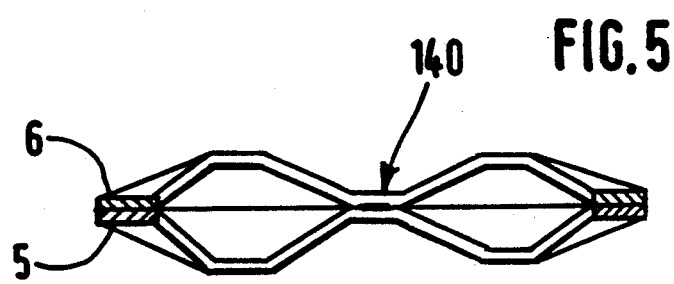
FIG. 5 is a view similar to FIG. 4, showing another embodiment.

In order to prevent any relative rotational movement occurring between the two rings 5 and 6, which would be detrimental to the series configuration, or action in series, of these rings, they may be adhesively secured at their nodes (or zones of contact). Alternatively, as indicated in FIG. 5 at 140, they may be welded together at their flattened contact zones. In this way, the rings 5 and 6 are indexed circumferentially with respect to each other while also being coupled together in rotation. This indexation may also be effected by the use of resilient supplementary lugs 100, 101, which can be seen in FIG. 6 and FIGS. 7A and 7B. In these Figures, the rings are indicated by the reference numerals 50 and 60. The lugs 100, 101 of the rings 50 and 60 are inclined with respect to the axis of the assembly in the same sense as the lugs 10 in FIG. 2, i.e. towards the thrust shoulder 3.

Figure 6:
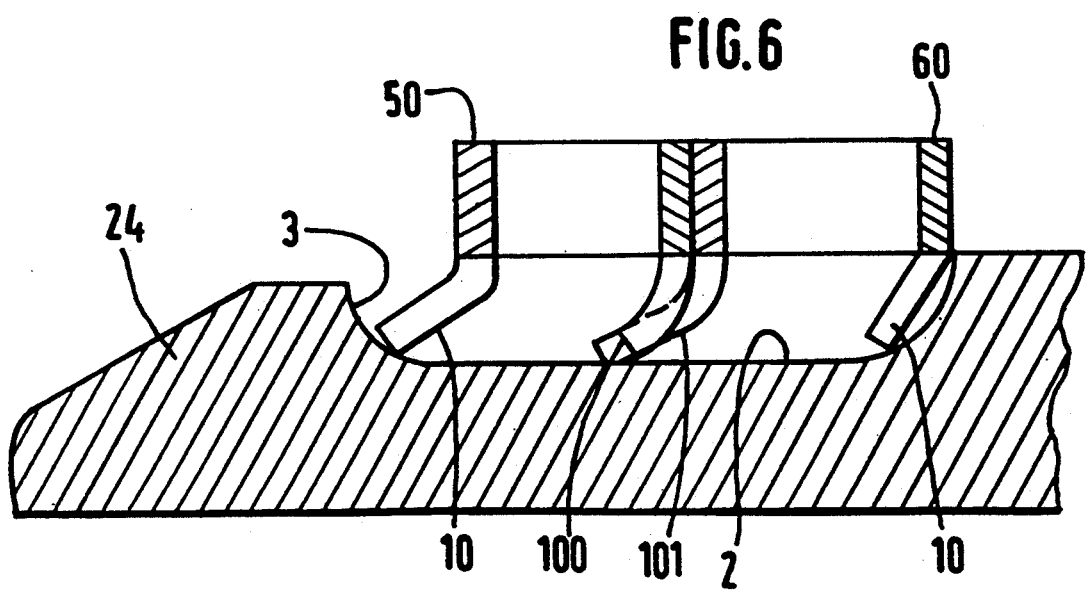
FIG. 6 is a view showing part of the actuating nose of the clutch release bearing before the latter has been snap-fitted, with another embodiment of the resilient retaining rings.

With reference therefore to FIGS. 6, 7A and 7B, each ring 50 or 60 is formed with alternate lugs 101 and 100 arranged circumferentially. The lugs 101 are longer than the lugs 100, with each lug 101 of a ring being arranged to fit between two lugs 100 of the other ring, as can best be seen in FIGS. 7A and 7B. With this arrangement the rings 50 and 60 can be made identical to each other, being offset from each other circumferentially, with the flat peaks 170 of one ring coming into contact, after rotation, with the flat troughs 180 of the other ring. To this end, each of the rings has two of the lugs 101 on each of its flat peaks 170, and one lug 100 in each of its flat troughs, for fitting between the corresponding pair of lugs 101 of the other ring as shown in FIG. 7B. These rings, indexed by rotation, are fitted by simply offering up one ring to the other, so as to fit each lug 100 between the lugs of a pair 101. To this end, the lugs are preferably chamfered as shown in FIGS. 7A and 7B. Any relative rotation between the rings 50 and 60 is thus avoided. Finally, it will be noted that the lugs 100 and 101 also act as retaining lugs outside the zones of contact between the rings.

However, it will of course realized that the resilient rings may consist of Belleville type rings, as indicated at 51 and 52 respectively in the modified embodiment shown in FIG. 8. These rings 51 and 52 are formed at their inner periphery with resilient lugs 200 which are inclined towards the thrust shoulder 3 as before. The Belleville rings 51 and 52 are mounted back to back so as to act in opposition (or in head to toe relationship), and they bear on the free end of the sleeve portion 15, and on the inner flank 7, 9 of the groove 2, respectively. Thus the rings 51 and 52 are inclined in opposite directions, being in contact with each other at their outer peripheries as can be seen in FIG. 8.

In the embodiments described above, the force exerted by the resilient rings 5 and 6, or 50 and 60, or 51 and 52, is smaller than the force required to open the coupling ring 16, so that these rings are first compressed so as to form an abutment for the subsequent opening of the ring 16. Here, the load exerted by these rings is smaller than the load exerted by the auto-centring spring 33 which is compressed during the fitting operation, with the retaining finger elements 22 (FIG. 3) coming into contact with the diaphragm fingers 11; a clearance occurs between the clutch diaphragm and the collar portion 14 during the fitting operation. This arrangement constitutes a natural abutment.

However, the opposite arrangement is of course possible, in which the force exerted by the resilient rings may be greater than the force required to open the coupling ring 16 by contact with the end profile 8 of the actuating nose. The choice depends on the application, and on the magnitude of the opening force of the coupling ring. Similarly, the load exerted by the centring spring or resilient ring 33 may be smaller than that exerted by the rings 5 and 6, or 51 and 52.

In addition, the present invention is, in general terms, not of course limited to the embodiments described above. In particular, the structures can be effectively reversed in the manner described in the specification of French patent application No. 91 11444 filed on 19 September 1991 not published up to the present time). In that case, the outer ring of the ball bearing is rotatable, and carries a housing which is secured to it by pressing. This housing is so configured as to define an actuating nose with a groove corresponding to the groove 2. The inner ring of the ball bearing is then non-rotating, but has an automatically centring coupling between itself and the manoeuvring sleeve corresponding to the manoeuvring element 25.

The clutch release bearing may be of a hydraulic type, for example as described in the specification of French patent application No. 91 13477, filed on Oct. 31, 1991 and not yet published. In this case, the manoeuvring sleeve acts as the actuating piston, being mounted for sliding movement on an axial fixed cylinder and replacing the usual declutching horn. If the preloading spring, which is conventionally an integral part of the control means, then no longer acts effectively on the piston (by urging the latter in the traction or pull-off direction), then disengagement of the snap-fitted attachment of the clutch release bearing cannot take place.

More than two resilient rings may be mounted in the groove 2, and the loads exerted by the rings 5 and 6 or 50 and 60 may be different. The rings may be separate from each other. Thus, and referring to FIG. 4, one of these rings would include inclined lugs at its peaks, while the other ring has inclined lugs in its troughs, the zones of contact between the rings not here being provided with lugs.

Figure 9:
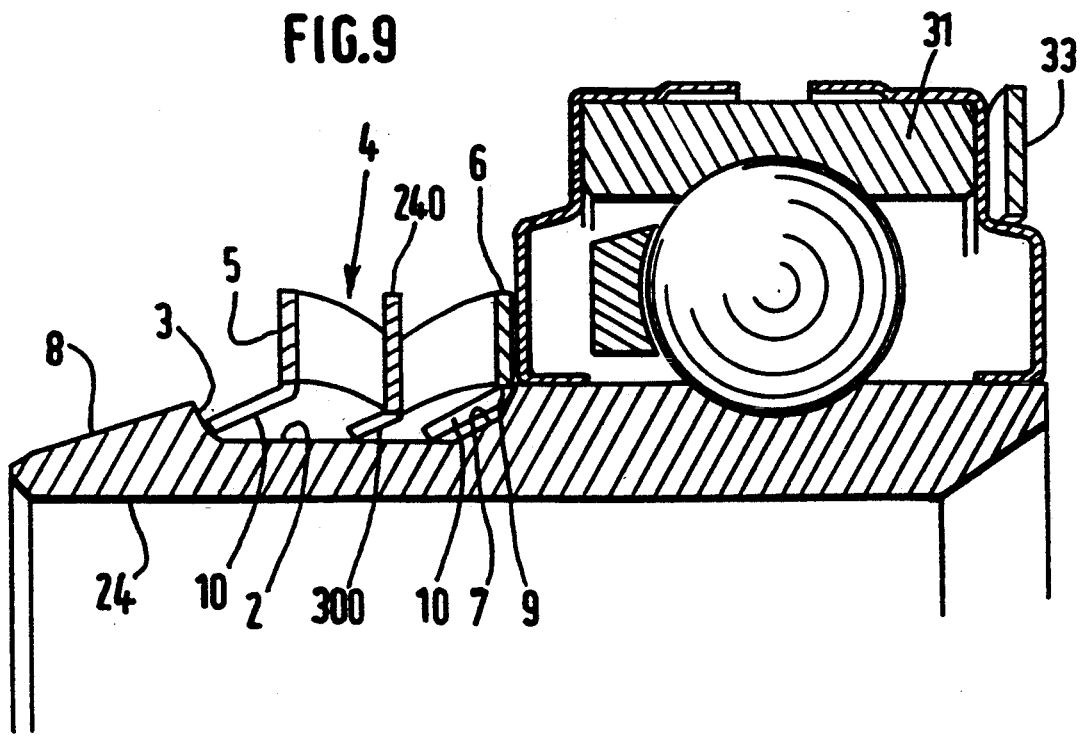
Figure 15:
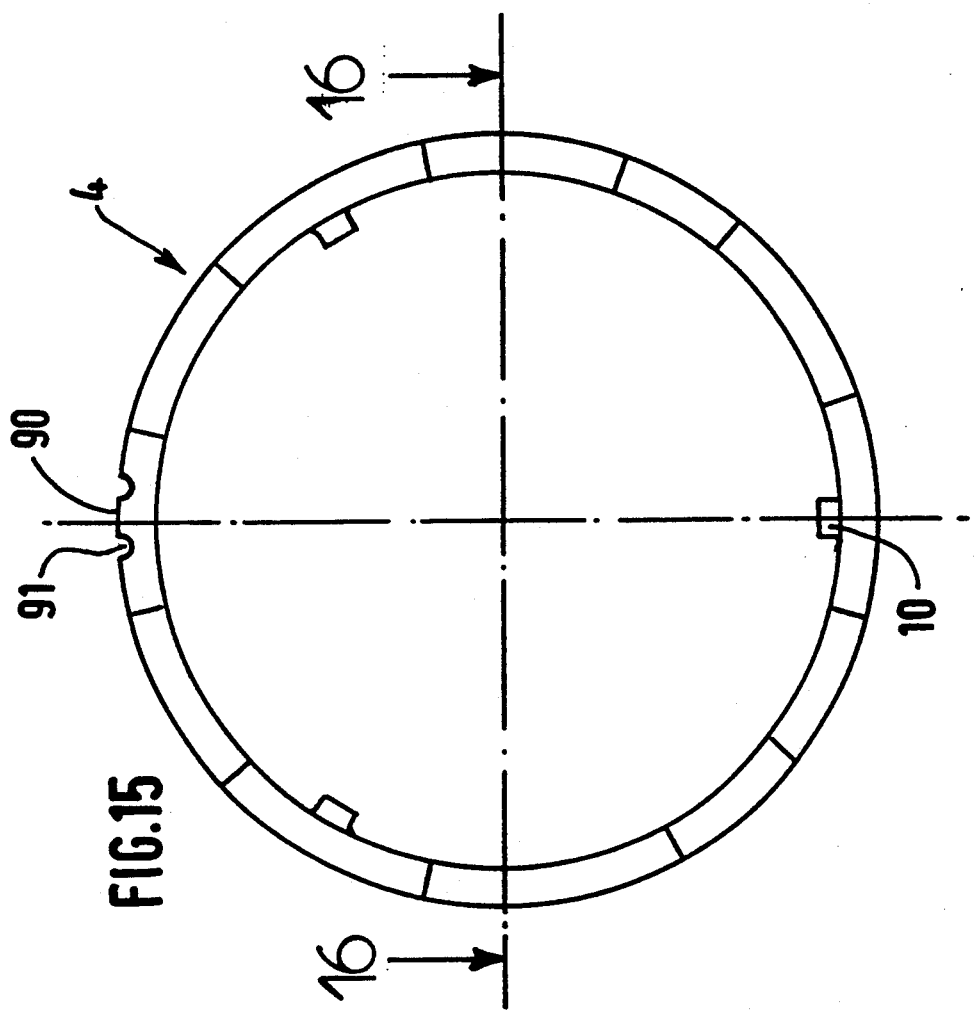
FIGS. 15 and 16 are views similar to FIGS. 13 and 14 respectively, but after the bending operation.

In another modification, shown in FIG. 9, a baffle ring 240 is mounted between the two separate, corrugated resilient rings 5 and 6, so that the latter are indexed with respect to each other so as to guarantee that they can be fitted one after the other. In this case, the baffle ring 240 may also be formed at its inner periphery with integral retaining and centring lugs 300 which, as can be seen in FIG. 9, are inclined towards the thrust shoulder 3.

Figure 10:
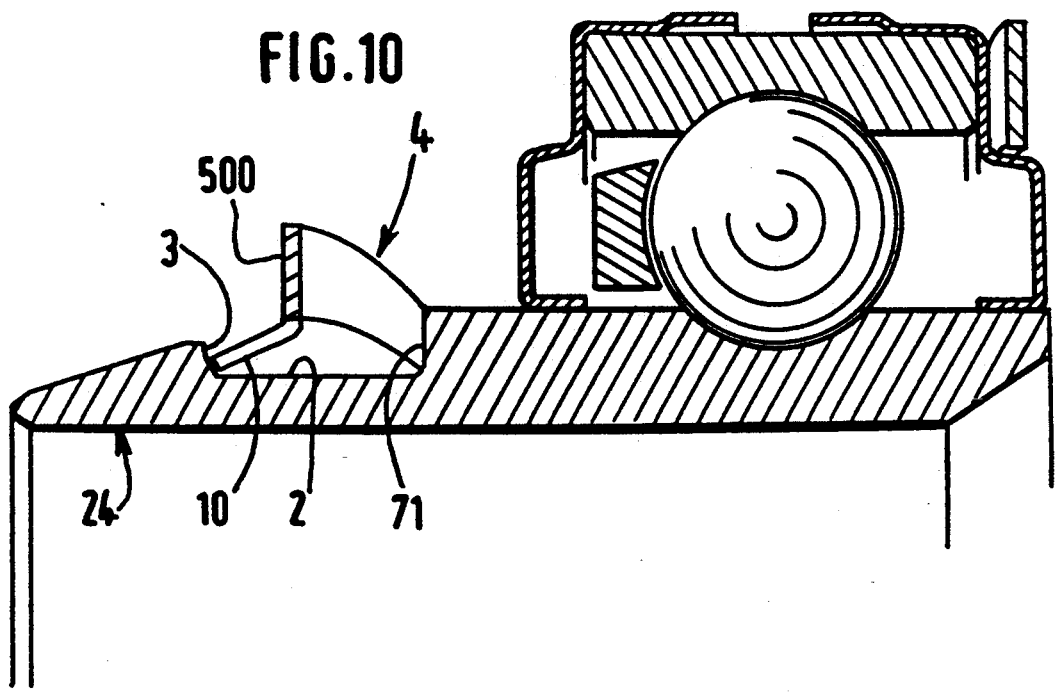
FIGS. 9 and 10 are views similar to FIG. 2 showing, respectively, two further embodiments of the invention.

Referring now to FIG. 10, this shows yet another variant in which there is only one resilient ring fitted in the groove 2. This ring is here indicated by the reference numeral 500, and in this case the inner flank of the groove 2 (71 in FIG. 10) consists of a simple radial surface which is joined to the base of the groove 2 by a radius. The resilient ring 500 can, again, have inclined lugs 10 formed in its inner periphery. In this case one of the rings 5 or 6 in Figure 1 or one of the rings 50 or 60 in FIG. 6 can be fitted in the groove 2, which is accordingly shortened as can be seen in FIG. 10. The ring acts between the free end of the sleeve portion 15 (FIG. 1) and the outer flank 71 of the groove. After the ring has been fitted, its inclined lugs 10 bear against the thrust shoulder 3.

Reference will now be made to FIGS. 11 to 17, in which a clutch release bearing 1, of the same general type as that described above with reference to FIGS. 1 to 10 in its various versions, is here characterized in that the two resilient rings 5 and 6 are preformed as a unitary assembly 4 with at least one connecting and indexing lug 90 which is integral with both of the rings. The latter are identical with each other. After the clutch release bearing 1 has been snap-fitted on to the connecting piece 13, the rings 5 and 6 act between the working surface on the free end of the sleeve portion 15 and the inner flank 70 of the groove 2, with the ring 5 bearing on the free end of the sleeve portion 15. Prior to the fitting of the clutch release bearing on the connecting piece 13, the rings 5 and 6 are retained between the two flanks of the groove comprising the thrust shoulder 3 and inner flank 70, preferably under precompression and without axial clearance. The unitary assembly 4 cannot thus become detached and lost.

Thus, as in the embodiments previously described, while the clutch release bearing is being fitted on the connecting piece, the actuating nose 24 penetrates into the sleeve portion of the connecting piece, while opening the coupling ring 16 of FIG. 1. As the movement is continued, the working surface of the free end of the sleeve portion 15 comes into contact with the ring 5, while the profiled front end 8 of the actuating nose comes into contact with the coupling ring 16. On further continuation of the movement, the rings 5 and 6, and the resilient ring 33, become compressed by the free end of the sleeve portion 15, causing the coupling ring 16 to open. The movement stops when the two rings 5 and 6 are fully compressed, as described above with reference to FIG. 3. Subsequently, the rings 5 and 6 automatically return the coupling ring 16 to its rear position, so that it is held between the thrust shoulder 3 and the drive surface 18 of the connecting piece 13.

It will be appreciated that in this way, it is again possible to provide an over-travel so that the snap-fitting action takes place over a substantial movement, and is therefore certain to be achieved by the unitary assembly 4. This prevents any accidental jamming of the rings. In addition, the outer diameter of the rings 5 and 6 is preferably made greater than the outer diameter of the free end of the sleeve portion 15, so as to make certain that the rings 5 and 6 (which in this example exert the same loads), will be compressed by the sleeve portion 15.

In this example the other, or inner, flank 70 of the groove is radial. Each resilient ring 5 and 6 has retaining means 10 at its inner periphery as in the embodiments previously described. Here again these retaining means consist of resilient lugs which are inclined towards the thrust shoulder 3. Again, the lugs 10 become lodged, preferably lightly, against the base of the groove 2, and are integral with the respective rings 5 and 6. Each inclined lug 10 projects from the inner periphery of the respective ring 5 or 6, to the body of which it is joined by a root zone at which a radius is formed. The lugs 10 act as centring means for the rings 5 and 6 in operation, so that the latter are automatically centred. In a modification, the lugs 10 may again be directed at right angles to the radial direction.

Thus, with particular reference to FIGS. 11 and 12, before the clutch release bearing is fitted on to the connecting piece 13, the rings 5 and 6 are held and centred positively in the groove 2. The lugs 10 of the ring 5 bear against the thrust shoulder 3, while the lugs 10 of the other ring 6 fit snugly against the flank 70. This arrangement renders the rings 5 and 6 stable, and enables the latter to be fitted by simply axially threading them on to the actuating nose 24, with the lugs 10 yielding naturally by contact with the leading end 8 of the actuating nose, before engaging in the groove 2. In addition, the ring 5 slides easily during the fitting operation.

It will be appreciated that the inclination of the lugs 10 is generally equal to the inclination of the engagement surface 17 of FIG. 1, so that mutual centring of the ring 5 with the sleeve portion 15 is obtained during the fitting operation, with tilting of the rings 5 and 6 being avoided in combination with the flank 70, both during fitting and in operation.

Figure 16:
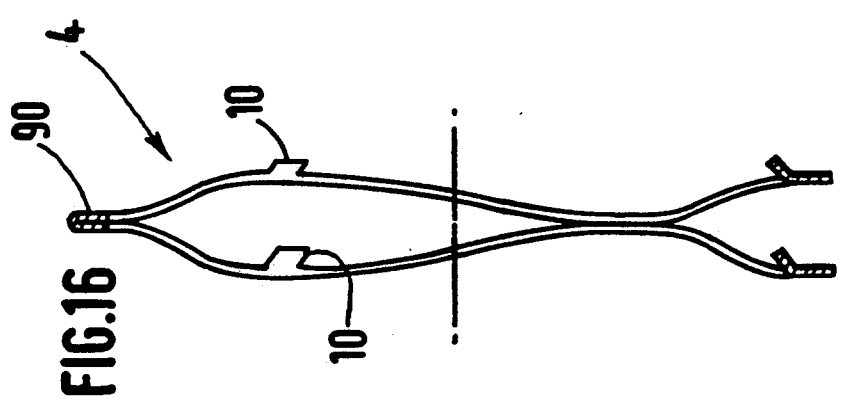

In the embodiment shown in FIGS. 10 to 16, the resilient rings consist of corrugated rings which are arranged in back to back relationship after the bending operation (see FIG. 16). The lugs 10 here project from the peaks of the corrugations before bending (see FIGS. 13 and 14), and to this end the peaks are flattened. More precisely, and with particular reference to FIGS. 13 and 14, the rings 5 and 6 are initially joined together in the mirror image arrangement shown, as extensions of each other. The axis of symmetry of the connecting lug 90 is the same as the longitudinal axis of symmetry 94 of the two rings. This axis 94 lies in the common diametral plane of the two rings, and the assembly 4 is thus generally in the form of a figure of eight.

Initially, the rings are therefore flat, and their flattened peaks lie in a common plane. The lugs 10 of the ring 5 are directed in a first axial direction, while the lugs 10 of the ring 6 extend in the opposite direction as can be seen in FIG. 14. The troughs of the corrugations of the two rings also lie in a common plane. The single component, or unitary assembly, 4 shown in FIG. 13 is made from a flat sheet metal blank by stamping, being then press-formed so as to form the corrugations with their flattened peaks and troughs. As can be seen in FIGS. 13 and 14, the connecting lug 90 initially joins one trough of one of the rings to a trough of the other ring.

After this first step, the lug 90 is bent over so that the component 4 is bent about the transverse axis of symmetry 93 of the lug 90, which is at right angles to the axis 94. During this bending operation, the back faces 95 and 96 of the rings 5 and 6 come into contact with each other, and likewise the troughs of the rings come into contact with each other. Because the rings 5 and 6 are identical with each other (apart from being in mirror image relationship), the arrangement obtained after the bending operation, in a given axial direction, is such that the peaks of the corrugations of the ring 5 are in contact with the troughs of the ring 6. Thus, the bending operation produces automatic indexing, so avoiding the need to rotate one of the rings with respect to the other in order to bring the peaks of one ring into contact with the troughs of the other. The two rings 5 and 6 are therefore able to be made in a simple way in series production in a way which guarantees that the two rings in the pair will lie in the correct relationship with each other. The connecting lug 90 does of course naturally prevent any rotation of one of the rings with respect to the other, which would be detrimental to the action of the rings in series.

Preferably, two slots 91 are formed in the root zone of the connecting lug 90 where it joins the rings 5 and 6, on either side of the lug. These slots 91 provide local zones of weakening which facilitate the bending operation about the axis 93. In this example these slots 91 are in the form of an oblong hole extending from one ring to the other, with one longitudinal side of the hole (namely the side away from the lug 90), being open in the centre. The lug 90 is thus folded over during the bending operation, as can be seen in FIG. 16. As this Figure also shows, the rings 5 and 6 are arranged back to back after the lug 90 has been bent, with their back faces 95 and 96 in facing relationship to each other and in contact with each other. The initial troughs of these corrugated rings are flattened so as to define flat zones that give a good zone of contact between the two rings.

The resilient rings may of course consist of Belleville rings 51 and 52 as shown in FIG. 17. FIG. 17 differs from FIG. 8 only in that the Belleville rings 51 and 52, instead of being separate from each other, are joined by a connecting and indexing lug 190. Thus in FIG. 17 the Belleville rings have lugs 200 at their inner periphery, inclined towards the thrust shoulder 3 as before, with the Belleville rings being mounted in back to back relationship and bearing respectively on the free end of the sleeve portion 15 and on the inner flank 7, 9 of the groove 2. In Figure 17, the Belleville rings 51 and 52 constitute a single component or unitary assembly, which is initially in the form of a figure of eight in which the rings are joined by the connecting lug 190, which is subsequently bent about its transverse axis of symmetry. The rings 51 and 52 are identical to each other but arranged in mirror image relationship in the figure of eight component. As in FIG. 13, the axis of symmetry of the connecting lug 190 lies at right angles to the common diametral plane of the two rings prior to the bending operation. Again as before, slots corresponding to the slots 91 are formed in the root zone joining the lug 190 to the rings 51 and 52.

In general terms, any other suitable form of weakening means may be provided in association with the connecting lug 90 or 190, for example a transverse cut, or a hole, formed along the axis 93 (FIG. 4), to facilitate bending of the lug.

In this example, as in FIGS. 1 to 10, the force which is exerted by the resilient rings 5 and 6, or 50 and 60, or 51 and 52 is smaller than the force required to open the coupling ring 16, so that the resilient rings are first compressed to define an abutment for the subsequent opening of the coupling ring. The force exerted by these rings is, in this example, smaller than the force exerted by the auto-centring spring element 33, which is compressed during the fitting operation.

Again as in FIGS. 1 to 10, the opposite arrangement is possible, in which the force which is exerted by the resilient retaining rings such as 5 and 6 is greater than the force required to open the coupling ring 16 by contact with the profiled end portion 8 of the actuating nose. Again the choice depends upon the application and on the value of the last mentioned force. Similarly, the force exerted by the spring element 33 may be smaller than that exerted by the resilient retaining rings.

The two resilient retaining rings may of course be made different to each other, for example by providing different distances separating the peaks and troughs of a ring, or by increasing the angle of inclination of one Belleville ring with respect to the other.

In a further modification, in place of a central connecting lug 90 or 190, two symmetrical lugs 92 may be provided. This alternative arrangement is indicated in broken lines in FIG. 13, in which the lugs 92 extend in a generally longitudinal direction, i.e. parallel to the common diameter of the two rings. However, these lugs 92 may instead be inclined with respect to the common diameter. Suitable holes or cuts may be provided to provide weakening of the lugs 92, again as indicated in broken lines in FIG. 13, so as to facilitate bending along the axis 93.

It will have been noted that the clutch release bearing 1 has a different structure in FIG. 11 from that shown, for example, in Figures 1 and 8. In particular, the flange 29 is extended at its outer periphery by an axially oriented annular terminal flange 129, which is formed with a groove in which a circlip 130 is fitted. The auto-centring spring ring 33 bears on the radial flange 29 so as to act on the outer ring 31 of the ball bearing, thus biassing the latter against the circlip 130. The radial flange 29 surrounds the outer ring 31 with a clearance. The clutch release bearing 1 thus no longer has the shroud 30 shown in FIG. 1.

The sliding sleeve 126 shown in FIG. 11 is of plastics material, force-fitted into the manoeuvring element 25. In this Figure, a further arm 127 is arranged in facing relationship with the arm or manoeuvring lug 27, for engagement with the declutching fork. The clutch release bearing can then be actuated by the latter, so that the clutch release bearing can be snap-fitted to the connecting piece 13 by means of the coupling ring 16 of FIGS. 1 to 10.

What is claimed is:

1. A clutch release bearing assembly, for a motor vehicle clutch having a declutching member defining an inner face of the declutching member, the assembly comprising a clutch release bearing including an actuating element and defining an axis of the assembly, and a connecting piece carried on the declutching member, the actuating element defining an actuating nose for acting in traction, through the connecting piece, on the inner face of the declutching member whereby to disengage the clutch, the connecting piece having a sleeve portion with an internal bore defining a drive surface, the assembly further including a coupling member which is resiliently deformable radially, the connecting piece carrying the coupling member internally for coupling the latter in traction to the actuating element, the actuating nose penetrating into the said sleeve portion of the connecting piece and being formed with a generally circumferential groove having an inner flank and an outer flank, the outer flank defining a thrust shoulder of the actuating element, wherein the coupling member is carried in the groove, the assembly further including resilient retaining means carried in the groove for acting axially between the actuating element and the connecting piece, so as to hold the coupling member permanently between the drive surface and the thrust shoulder, wherein the groove is elongated axially away from the thrust shoulder, the resilient retaining means comprising at least one axially acting resilient retaining ring prefitted in the groove, and the thrust shoulder constituting an abutment for the said resilient retaining ring before the clutch release bearing is fitted to the connecting piece.

2. A clutch release bearing assembly according to claim 1, wherein the sleeve portion of the connecting piece defines a circular free end thereof, the external diameter of the resilient retaining ring being greater than that of the free end, the resilient retaining ring being operatively interposed between the free end and the inner flank of the groove.

3. A clutch release bearing assembly according to claim 1, wherein the resilient retaining ring includes retaining means on its inner periphery, for retaining and centring said ring in said elongated groove of the actuating element.

4. A clutch release bearing assembly according to claim 3, wherein the retaining means of the retaining ring comprise a plurality of lugs inclined with respect to the axis of the assembly towards the thrust shoulder in said groove.

5. A clutch release bearing assembly according to claim 4, wherein the free end of the sleeve portion of the connecting piece defines a frustoconical internal engagement surface, which itself defines an inclination, with respect to the axis of the assembly, substantially equal to the inclination to the axis defined by the inclined lugs.

6. A clutch release bearing assembly according to claim 1, wherein said resilient retaining means comprise a plurality of said axially acting resilient retaining rings, the groove in the actuating element being elongated accordingly, said retaining rings being mounted so as to act in series between the said free end of the sleeve portion and the inner flank of the groove.

7. A clutch release bearing assembly according to claim 6, wherein said resilient retaining rings are corrugated rings mounted back to back.

8. A clutch release bearing assembly according to claim 7, wherein said resilient retaining rings are substantially identical to each other and offset circumferentially with respect to each other, with each retaining ring having corrugations with peaks and troughs defining respective contact zones of the ring, the peaks of one of the rings being in contact with the troughs of the next adjacent ring.

9. A clutch release bearing assembly according to claim 7, further including indexing means for indexing said resilient retaining rings circumferentially with respect to each other, and for ensuring that they act in series.

10. A clutch release bearing assembly according to claim 9, wherein said indexing means comprise means securing the resilient retaining rings together at their contact zones, whereby to prevent relative rotation between said rings.

11. A clutch release bearing assembly according to claim 9, wherein each said retaining ring has a plurality of inclined lugs at its contact zones, for contact with the next adjacent ring, the inclined lugs defining the said indexing means, with said lugs of one ring fitting between corresponding lugs of the next adjacent ring so as to prevent relative rotation between the rings, the lugs being of different lengths such that a first lug on one said ring cooperates with at least one shorter second lug of the other ring.

12. A clutch release bearing assembly according to claim 9, including a baffle ring interposed between two adjacent corrugated resilient retaining rings and defining said indexing means.

13. A clutch release bearing assembly according to claim 6, wherein said resilient retaining means comprise Belleville rings inclined in opposite directions.

14. A clutch release blearing assembly according to claim 1, wherein the inner flank of the groove of the actuating nose defines a radial outer portion and a generally inclined inner portion radially inward of the outer portion, with said resilient retaining ring fitting snugly against said inner portion.

15. A clutch release bearing assembly according to claim 6, wherein the resilient retaining means comprise a single component defining two said resilient retaining rings and at least one connecting and indexing lug joining the two rings integrally together.

16. A clutch release bearing assembly according to we claim 15, wherein, in said component, the two rings are disposed in side by side mirror image relationship as extensions of each other.

17. A clutch release bearing assembly according to claim 16, wherein said connecting lug defines an axis of symmetry consisting of a longitudinal axis of the two rings, and being a diameter of each ring.

18. A clutch release bearing assembly according to claim 16, wherein said connecting lug defines weakening means for facilitating bending of the connecting lug.

19. A clutch release bearing assembly according to claim 18, wherein the connecting lug defines a root zone joining it to each said ring, the weakening means comprising a pair of slots formed in said root zone.

20. A clutch release bearing assembly according to claim 15, wherein each said resilient ring is a corrugated ring having a plurality of lugs inclined towards said thrust shoulder in said elongated groove of the actuating element, for retaining the rings and centering them in the groove, said lugs of one of the rings being initially directed axially in a direction away from the lugs of the other ring.

21. A clutch release bearing assembly according to claim 20, wherein each ring defines peaks and troughs of its corrugations, the connecting lug initially joining a trough of one of the rings to a trough of the other ring.

22. A clutch release bearing assembly according to claim 21, wherein said peaks and said troughs are flattened, the peaks of a said ring lying in a first common plane and the troughs of the same ring lying in a second common plane.

* * * * *